United States Patent Office 3,796,630
Patented Mar. 12, 1974

---

3,796,630
MICROBIAL PRODUCTION OF DICARBOXYLIC ACIDS
Eugene H. Wegner, Bartlesville, Okla., assignor to Phillips Petroleum Company
No Drawing. Continuation-in-part of abandoned application Ser. No. 132,594, Apr. 8, 1971. This application Oct. 4, 1971, Ser. No. 186,472
Int. Cl. C12d 1/02
U.S. Cl. 195—28 R          11 Claims

ABSTRACT OF THE DISCLOSURE

Dicarboxylic acids are produced from $C_6$–$C_{22}$ n-paraffins by microbial oxidation in cultures containing a mutant of the yeast *Torulopsis bombicola*.

---

This is a continuation-in-part of my application Ser. No. 132,594, filed Apr. 8, 1971, now abandoned.

This invention pertains to the microbial production of dicarboxylic acids.

In one of its more specific aspects, this invention pertains to the fermentation of n-alkane to produce dicarboxylic acid by mutants of microorganisms known as *Torulopsis bombicola*.

There has been discovered a method wherein a yeast mutant of such cultures and particularly a mutant of *Torulopsis bombicola* cultured on a sucrose-containing medium converts n-paraffins to dibasic alpha,omega acids which accumulate in the medium as free acids. This invention concerns that method.

According to the present invention there is provided a method for the microbial production of dicarboxylic acids comprising fermenting a n-alkane having 6 to 22 carbon atoms with a dicarboxylic acid-producing mutant of *Torulopsis bombicola* and recovering the dicarboxylic acid-produced.

In a second embodiment of the present invention a mutant of the above referred to mutant of *Torulopsis bombicola* is employed to convert n-paraffins to diterminal carboxylic acids.

In its preferred embodiment a yeast mutant of *Torulopsis bombicola*, cultured on a sucrose-containing culture medium and n-octadecane, produces 1,18-octadecanedioic acid as the major product.

The parent culture of *Torulopsis bombicola*, $\eta_{sp.}$, PRL 319–67, is obtainable from Prairie Regional Laboratory, National Research Council of Canada, Saskatoon, Saskatchewan. The yeast mutant employed in the present invention is produced in accordance with the following preferred procedure.

A 0.5 ml. sample of a 3-day culture of *Torulopsis bombicola* grown on an after-defined sucrose-containing nutrient is added to 100 ml. of an after-defined glucose-containing nutrient and the mixture is agitated for a period of about five hours. Thereafter, 5 ml. of a 300 milligrams per 100 ml. solution of N-methyl-N-nitroso-N'-nitroguanidine is added to the culture. Agitation is continued for about one-fourth hour and a one milliliter sample is removed and plated on plates at a $10^5$ dilution.

After six days incubation at 25° C., the plates, averaging 26 colonies per plate, are replicated on nonglucose based media containing 0.2 weight percent methyl laurate and on the glucose-containing nutrient.

After six days incubation at 25° C., colonies which develop on the glucose-containing nutrient but not on the methyl laurate-containing media are selected and tested to determine if they produce long-chain dicarboxylic acids from n-praffins.

The glucose-containing nutrient employed in the above-described procedure for producing the mutant was of the following composition per liter of aqueous solution.

| Component: | Grams per liter |
|---|---|
| Commercial yeast extract | 3 |
| Malt extract | 3 |
| Peptone | 5 |
| Glucose | 10 |

The production of the dicarboxylic acids employing the mutant whose preparation was described above can be carried out at a temperature between about 20° C. and about 36° C., with the preferred range being from about 24° C. to about 32° C. The reaction is preferably agitated sufficiently to maintain the contents of the reactor substantially uniform. The reaction is conducted with air being introduced at a rate between about 0.05 to about 1 volume of air per volume of liquid per minute.

The sucrose-containing nutrient employed in Examples I–IV was prepared by dissolving the following ingredients in sufficient distilled water to give a liter of solution.

| Component: | Grams per liter |
|---|---|
| Sucrose | 40 |
| Commercial yeast extract | 5 |
| Urea | 1 |
| $KH_2PO_4$ | 1 |
| $MgSO_4 \cdot 7H_2O$ | 3 |
| Mineral solution, 1 ml. | |

The mineral solution specified above was prepared by adding the following materials, in the quantities shown, to water to form one liter of solution.

| Components: | Grams per liter |
|---|---|
| $CuSO_4 \cdot 5H_2O$ | 0.06 |
| KI | 0.08 |
| $MnSO_4 \cdot H_2O$ | 0.30 |
| $NaMoO_4 \cdot 2H_2O$ | 0.20 |
| $H_3BO_3$ | 0.02 |
| $ZnSO_4 \cdot 7H_2O$ | 2.0 |
| $FeCl_3 \cdot 6H_2O$ | 4.8 |

It is preferable to maintain the glucose level in the culture at less than about 1 percent in order to minimize production of the mono-acids and glycolipids. Accordingly, sucrose is preferentially maintained in the reaction medium.

The method of this invention is illustrated by the following examples.

EXAMPLE I

A four liter sample of the sucrose-containing medium specified above was inoculated with 500 ml. of a 5-day-old culture of the *Torulopsis bombicola* yeast mutant whose preparation was described above. Fifty (50) g. of n-octadecane were added to the mixture and the temperature of the composite was adjusted to about 30° C. The mixture was agitated and air was introduced at a rate of about 0.10 volume per minute per volume of fermentation liquor. Fermentation was continued for 137 hours.

The culture was then acidified and extracted with diethyl ether. The ether layer was evaporated to leave a residue which was treated with boron trifluoride-methanol reagent to convert the acids to methyl esters to facilitate analysis and evaluation of the results. The esters were analyzed by gas chromatography, and the following results were obtained:

| Ester: | Production g., ester per kilogram culture |
|---|---|
| Methyl hexadecanoate | 0.07 |
| Methyl octadecanoate | 0.26 |
| Dimethyl tetradecanedioate | 0.10 |
| Dimethyl hexadecanedioate | 0.50 |
| Dimethyl octadecanedioate | 1.86 |

The isolation and separation of the free acids can be accomplished by fractional crystallization from chloroform. For example, the dried ether extracts from a portion of the above culture were dissolved in hot chloroform from which the diacids crystallized upon cooling. The product so obtained contained about 75 percent 1,18-octadecanedioic acid and about 25 percent 1,16-hexadecanedioic acid.

EXAMPLE II

The production of the diacids is increased by adding to the fermentation medium alkali metal salts of carboxylic acids, preferably the sodium salts, either individually or as mixtures. Preferably, these are included in the fermentation liquor in an amount from about 0.02 to about 2.0 weight percent.

This is illustrated by the following in which individual runs were conducted employing sodium acetate, sodium citrate and a mixture of sodium acetate and of sodium citrate. The runs were identical to that described above except that in each instance about 0.2 weight percent per cent of the individual salt, or about 0.4 weight percent of an equal mixture of the two salts, was added to the medium. The culture was then inoculated, grown and analyzed as previously described after the number of hours indicated to determine the methyl ester derivatives. Results were as follows:

| Run number | II | III | IV |
|---|---|---|---|
| Salt added | Sodium citrate | Sodium acetate | Mixture |
| Growth, hours | 96 | 101 | 101 |
| Ester analysis, g./kg. culture: | | | |
| Methyl hexadecanoate | 0.23 | 0.19 | 0.21 |
| Methyl octadecanoate | 0.65 | 0.53 | 0.56 |
| Dimethyl dodecanedioate | 0.18 | 0.18 | 0.20 |
| Dimethyl tetradecanedioate | 0.39 | 0.35 | 0.48 |
| Dimethyl hexadecanedioate | 0.82 | 0.98 | 1.02 |
| Dimethyl octadecanedioate | 3.05 | 3.60 | 3.93 |

It will be seen from the above data when compared with an analysis set forth in Example I, that the inclusion of the salts concerned increases the production of the diacids.

In the second embodiment of the present invention a mutant of the above-discussed mutant of *Torulopsis bombicola* is employed to convert n-paraffins to diterminal carboxylic acids, the resulting selectivity being greater than that resulting from the use of the above-discussed mutant, referred to as Mutant I. The mutant of the second embodiment, referred to as Mutant II, is derived from Mutant I by the use of the chemical mutagenic agent N-methyl-N-nitroso-N'-nitroguanidine in the same procedure as that employed to product Mutant I. Those colonies that fail to develop on an ethanol-containing media are selected and tested to determine if they are more selective in producing dicarboxylic acids than Mutant I. Similarly, Mutant II is employed to produce the diterminal carboxylic acids in accordance with that procedure employed in Mutant I.

Mutant II is more highly selective in its production of the diterminal acids than is Mutant I as shown by the following data which indicate the products produced by employment of Mutant I and Mutant II, individually, in the conversion of n-octadecane feed to diterminal carboxylic acids:

| Product acid, g./l. culture | Mutant I | Mutant II |
|---|---|---|
| $C_{16}$ monoacid | 0.16 | None |
| $C_{18}$ monoacid | 0.50 | 0.51 |
| $C_{12}$ diacid | 0.23 | None |
| $C_{14}$ diacid | 0.68 | None |
| $C_{16}$ diacid | 1.47 | None |
| $C_{18}$ diacid | 3.60 | 5.57 |

The above data indicate a much higher selectivity for Mutant II than Mutant I.

It will be understood that various modifications can be made to the method of this invention. However, such are considered to be within the scope of the invention.

What is claimed is:

1. A method of producing a dicarboxylic acid which comprises:
   (a) fermenting a liquor comprising a n-alkane having 6 to 22 carbon atoms with a dicarboxylic acid-producing yeast derived from the mutation of *Torulopsis bombicola*, $\eta_{sp}$; PRL 319–67, Prairie Regional Laboratory, National Research Council of Canada, under conditions to convert said n-alkane to at least one dicarboxylic acid; and,
   (b) recovering said dicarboxylic acid.

2. The method of claim 1 in which alpha,omega dicarboxylic acids are produced.

3. The method of claim 1 in which the fermenting is conducted at a temperature within the range of about 20° C. to about 36° C. and air is introduced at a rate of about 0.05 to about 1 volume of air per minute per volume of fermentation liquor.

4. The method of claim 1 in which said fermenting is carried out in the presence of sucrose and in the presence of less than about 1 percent glucose.

5. The method of claim 1 in which said alkane is n-octadecane and said dicarboxylic acid is 1,18-octadecanedioic acid.

6. The method of claim 5 in which the fermenting is conducted at about 30° C. and air is introduced at a rate of about 0.10 volume per minute per volume of fermentation liquor.

7. The method of claim 6 in which 0.4 weight percent of a mixture comprising sodium citrate and sodium acetate is present in said liquor.

8. The method of claim 1 in which said liquor contains the salt of one of sodium acetate and sodium citrate and their mixtures.

9. The method of claim 8 in which said salt is contained in an amount from about 0.02 to about 2.0 weight percent of said liquor.

10. The method of claim 1 in which said *Torulopsis bombicola* is mutated to produce a first mutant and said first mutant is mutated to produce a second mutant and said second mutant is employed in said fermenting of said liquor.

11. The method of claim 10 in which said first mutant is contacted with N-methyl-N-nitroso-N'-nitroguanidine to produce said second mutant.

References Cited
FOREIGN PATENTS
1,211,246   6/1968   Great Britain _____ 195—30

OTHER REFERENCES
Ogino, Shigo: "Studies on Utilization of Hydrocarbons," Agr. Biol. Chem., vol. 29, No. 11, pp. 1009–15.

Jones et al.: J. Chem. Soc. (c) 1968, pp. 2816–2821.

A. LOUIS MONACELL, Primary Examiner

T. G. WISEMAN, Assistant Examiner

UNITED STATES PATENT OFFICE
CERTIFICATE OF CORRECTION

Patent No. 3,796,630          Dated March 12, 1974

Inventor(s) EUGENE H. WEGNER

It is certified that error appears in the above-identified patent and that said Letters Patent are hereby corrected as shown below:

Column 1, line 47, and column 4, line 21, cancel "$\eta_{sp}$." and insert -- n. sp. -- .

Signed and sealed this 16th day of July 1974.

(SEAL)
Attest:

McCOY M. GIBSON, JR.
Attesting Officer

C. MARSHALL DANN
Commissioner of Patents